UNITED STATES PATENT OFFICE.

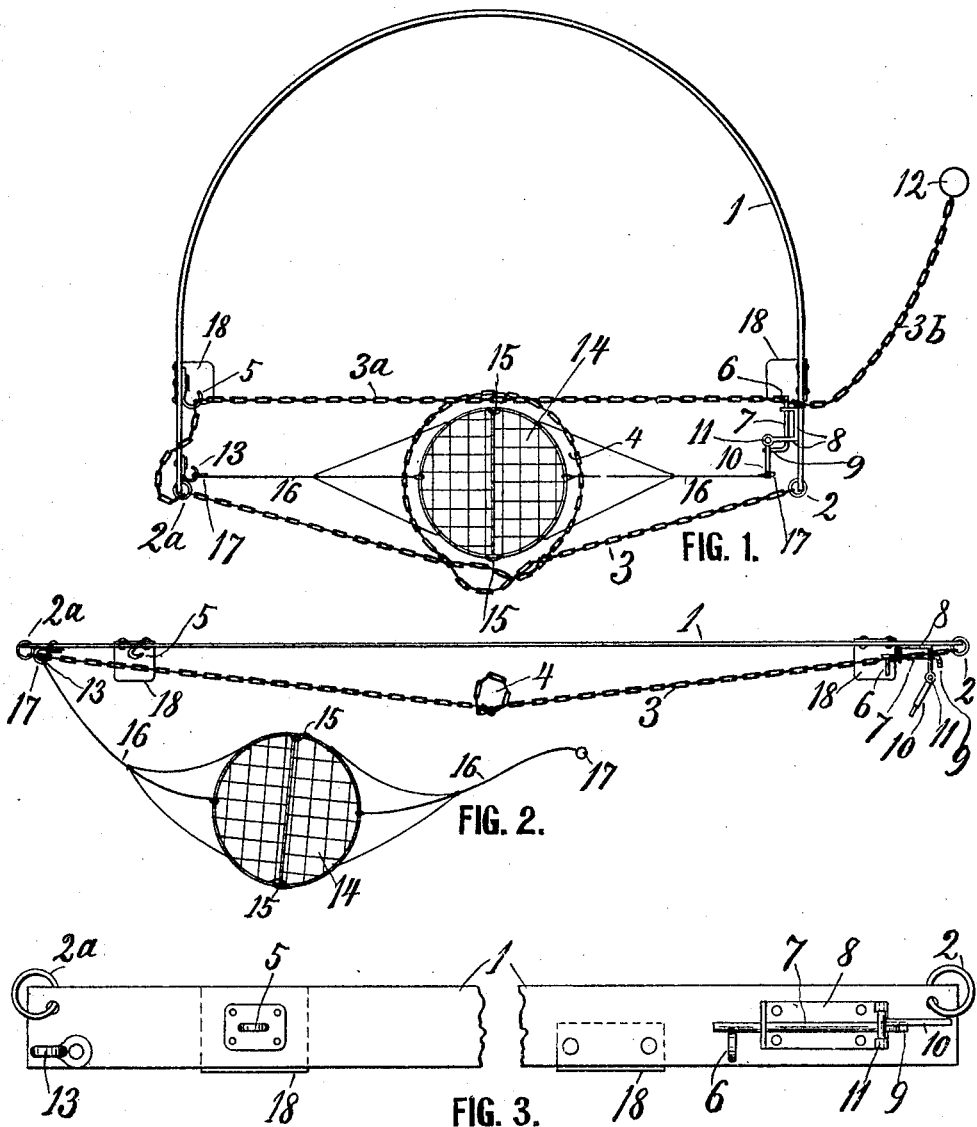

ABNER JOHNSON, OF STRANDQUIST, MINNESOTA.

ANIMAL-TRAP.

No. 872,429.

Specification of Letters Patent.

Patented Dec. 3, 1907.

Application filed April 11, 1907. Serial No. 367,487.

*To all whom it may concern:*

Be it known that I, ABNER JOHNSON, a citizen of the United States, residing at Strandquist, in the county of Marshall and State of Minnesota, have invented a new and useful Animal-Trap, of which the following is a specification.

My invention relates to animal traps, and the object is to provide a cheap, novel and effective trap for catching any kind of animals by tying a cord, cable or chain about one or more of their legs. This and other objects I attain by the novel construction and arrangement of parts illustrated in the accompanying drawing in which—

Figure 1 is a top or plan view of my trap in set position. Fig. 2 is a plan view of the trap in the sprung position. Fig. 3 is a front elevation of Fig. 2 showing the spring bar and locking mechanism and parts to which the chain is fastened.

Referring to the drawing by reference numerals, 1 designates a flat bar of spring steel, which is normally straight as in Fig. 2, but when the trap is set it assumes the horseshoe-shape shown in Fig. 1. To the ends of said bar is secured, preferably by means of rings 2 and 2ª, a chain 3, at the middle of which is formed a loop 4 of the type known as a simple overhand knot. From the ring 2ª is extended another chain 3ª, which may preferably be an extension of chain 3, to a hook 5 and thence to a curved normally depending arm 6 of a rock shaft 7, journaled in a bracket 8 and having at its other end a normally horizontal arm 9 engaged, when the trap is set, by a trip-lever 10 pivoted at 11 in the bracket. The chain 3ª may be extended as 3ᵇ and secured to a post 12, by which the trap is secured so that the animal cannot carry it away.

When the trap is set the loop 4 is opened to its widest limit as in Fig. 1, and below the loop is placed a trip 14, in the present instance it is made of wire netting with a joint 15 across it, but it may also be a solid plate. The ends of the trip are provided with wires 16 having rings 17 which are placed one on the hook 13 and the other on the end of the trip lever 10, so that when the animal steps on the trip 14 the lever or arm 10 will swing inward and release the arm 9, whereby the chain 3ª, which holds the trap set, will escape from arm 6 of the rocker-shaft and allow the bar 1 to jump to its straight position and thereby tighten the loop 4 about the leg of the animal.

18 are plates secured on the spring bar 1 to prevent sinking of the trap in loose ground or in the snow, where it may be used to great advantage for rabbits and other animals that prefer stepping or jumping in the tracks already formed in the snow by themselves or other animals, so that when the trip 14 is placed in or below such foot prints or pits and the trap concealed in the snow, the game cannot avoid it.

Having thus described my invention, what I claim and desire to secure by Letters Patent is:—

1. An animal trap comprising a normally straight spring bar, an integral chain secured with the ends to the ends of the spring bar and having intermediate its ends its middle portion formed into a loop adapted to catch the animal, means for holding the spring bar bent when the trap is set, and means for tripping the trap.

2. An animal trap comprising a flexible member with an over hand knot on it by which to catch the animal, and a spring secured with an end to each end of the flexible member to pull the knot tight when the animal is in it.

3. An animal trap comprising a normally substantially straight spring bar adapted to be curved to a horse-shoe-shape, a chain secured with an end to each end of the spring and having a loop in which to catch the animal, a tripping device carried by one end of the spring, a trip adapted to be placed below the catching loop and having one end detachably held by the tripping device and the other end secured to the other end of the spring, a chain holding the spring in set position and being detachably held by the tripping device so as to spring the trap when the trip is operated.

4. An animal trap comprising a normally substantially straight spring bar adapted to be curved to a horse-shoe-shape, a chain secured with an end to each end of the spring and having a loop in which to catch the animal, a tripping device carried by one end of the spring, a trip adapted to be placed below the catching loop and having one end detachably held by the tripping device and the other end secured to the other end of the spring, a chain holding the spring in set position and being detachably held by the tripping device so as to spring the trap when the trip is operated, and a chain for securing the trap against removal by the animal, said chain and the chain holding the trap set and the catching chain being made integral.

In testimony whereof I affix my signature, in presence of two witnesses.

ABNER JOHNSON.

Witnesses:
　NELS A. JOHNSON,
　P. O. HANSON.